Dec. 8, 1942.   H. J. CRINER   2,304,244
COUPLING
Filed Jan. 22, 1941   2 Sheets-Sheet 1
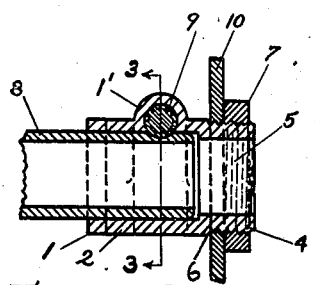
Fig—2
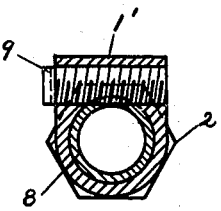
Fig—3
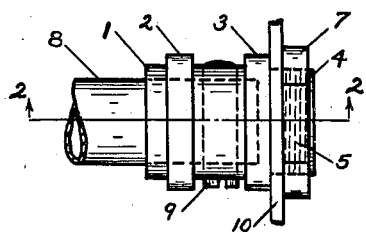
Fig—1
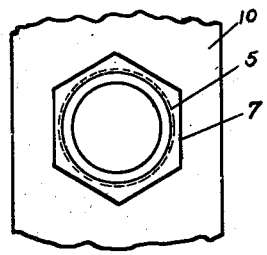
Fig—4
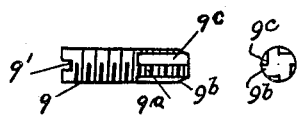
Fig. 5.   Fig. 5A.   Fig. 5B.   Fig. 5C.
Harry J. Criner, INVENTOR.
BY Bush & Bush,
ATTORNEYS.

Dec. 8, 1942.   H. J. CRINER   2,304,244
COUPLING
Filed Jan. 22, 1941   2 Sheets-Sheet 2

Harry J. Criner, INVENTOR.
BY Bush & Bush, ATTORNEYS.

Patented Dec. 8, 1942

2,304,244

UNITED STATES PATENT OFFICE 2,304,244

COUPLING

Harry J. Criner, Davenport, Iowa, assignor of one-half to A. G. Bush, Davenport, Iowa Application January 22, 1941, Serial No. 375,401

3 Claims. (Cl. 285—6.5)

My invention relates to improvements in method and apparatus for securely fastening conduits or pipes to the walls of boxes or receptacles such as fuseboxes, meters, turn-boxes, and other equipment where a conduit has to be securely fixed to the walls of a chamber of any sort.

The objects of my invention are to provide an improved and simplified method and apparatus by which conduits for electric wires or other things can be firmly and easily attached to fuseboxes, meters, transformers or other apparatus or movable containers or fixtures, by means which will permit ready removal thereof when desired, but which will provide against leakage of rainwater and against accidental displacement or loosening due to wear, vibration or other unintended cause. Other objects will appear in the description.

I accomplish these objects by the means illustrated in the accompanying drawings, in which—

Figure 1 is a plan view of a portion of the sidewall of a box with the conduit attached to it by my apparatus;

Figure 2 is a longitudinal section on the line 2—2 of Figure 1;

Figure 3 is a cross-section on the line 3—3 of Figure 2;

Figure 4 is an inside elevation of the side of the box with my apparatus secured thereon;

Figures 5 and 5A are side and end views, respectively, of an alternate form of locking pin;

Figures 5B and 5C are details of the locking pin as shown in Figure 3 and show the outer end 9d of the thread squared off on a radial line and hardened to adapt it to cut a new thread in the portion of the conduit with which it comes in contact, the maximum thickness of that portion being equal to the height of the threads;

Figures 9, 10:
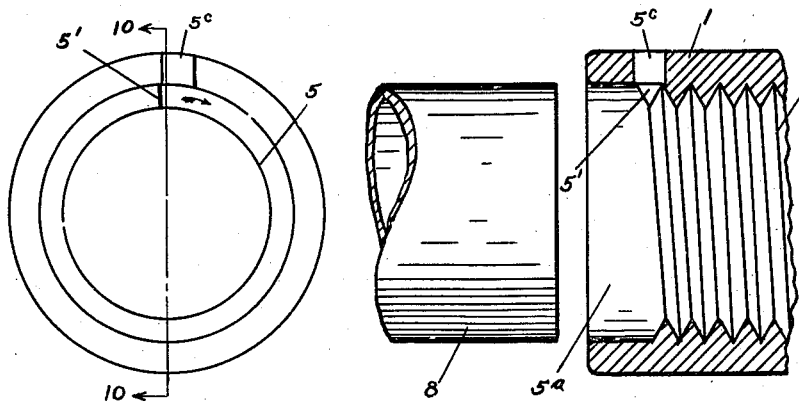
Figure 9 shows an enlarged detail end view of the outer end of the sleeve 1 showing the squared off end 5' of the outermost thread formed to act as a cutter to cut its way into the periphery of the conduit.

Figure 10 is an enlarged detail of the conduit 8 and the sleeve 1 with a bore 5a formed in the outer end of the sleeve 1 equal in diameter to the outside diameter of the conduit.

Similar numerals refer to similar parts throughout the several views.

My apparatus in its preferred form, comprises a coupling sleeve 1 which is tubular in form and has a raised transverse hub 1' formed integral therewith.

The bore of the outer end of the sleeve is preferably of the right diameter to fit closely upon the end of the conduit 8 inserted therein and the inner end 4 of the sleeve is reduced in diameter so that a shoulder 6 is formed which will abut against the wall 10 of a fusebox or other receptacle to which it is to be attached. The inner end 4 of the sleeve is externally threaded to mesh with the internal threads 5 of the locknut 7.

The hub 1' is provided with a longitudinal bore which extends through it at right angles to the axis of the conduit 8. The bore is internally threaded to receive a threaded lock-pin 9 which may be a simple continuously externally threaded pin as shown in Figure 3 with the outer end 9d of the thread cut off on a radial line extending outwardly from the axis of the pin 9 as shown in Figure 5A, or it may be provided with channels 9c similar to those formed in the ordinary threading tap. The opposite end of the pin 9 may be provided with a channel 9' by which it may be turned by an ordinary screw-driver or it may be provided with a head of any desired kind to be turned by a wrench.

After the pin 9 is formed, the cutting end of the thread or threads is hardened.

A portion of the sleeve 1 may be provided with an hexagonal band 2 or 3 to afford an easy grip for a wrench to assist in screwing it into the sidewall 10 in case the sidewall is threaded as shown in Figure 2 and this will afford additional means of securing the sleeve 1 in the sidewall.

In the operation of my apparatus the sleeve 1 is first screwed into the sidewall 10 and the locknut 7 then placed upon the inner end 4 of the sleeve 1 and tightened with a wrench, pliers or other suitable tool. This may be done either before the box is secured in place in the wall or in whatever position it is to occupy or after that is done.

After the box is secured in place the conduit 8 has its inner end inserted in the sleeve 1. The pin 9 is then inserted in the bore in the hub 1' and screwed into place with a screw-driver or other means. The bore is so located that as the screw is driven home, the cutting end 9d of the thread will contact the outer surface of the conduit 8 and cut external segmental transverse threads therein which will fit snugly upon the threads of the pin 9. The pin 9 and its threads will then act to prevent any lateral or rotational vibration of the conduit which might tend to dislodge it and the pin itself will prevent the conduit from slipping out of the sleeve. When desired to dismantle the connection, it is only necessary to unscrew the pin 9 and remove it and the conduit 8 may then be readily pulled out of the sleeve 1. Then the lock-nut 7 may be removed and the sleeve unscrewed from the sidewall 10 of the box.

It is not necessary for the sidewall 10 to be threaded, for the hex band 2 will afford means by which it can be held against turning while the lock-nut 7 is being screwed or unscrewed.

The pin 9 is preferably made of soft steel or steel alloy susceptible of being hardened and the threads and grooves, if any, therein may be cut before it is hardened and the pin then hardened to any desired degree.

The conduit 8 may be of iron, copper, aluminum or any other desired metal or alloy capable of being cut by the cutting operation of the pin 9.

Figure 7:
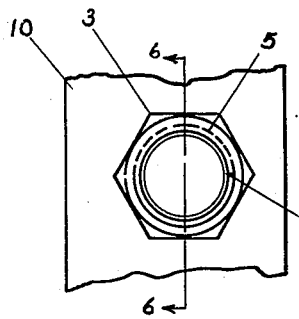
Figure 7 shows an outer end view of the coupling from the left of Figure 6.
Figures 6, 8:
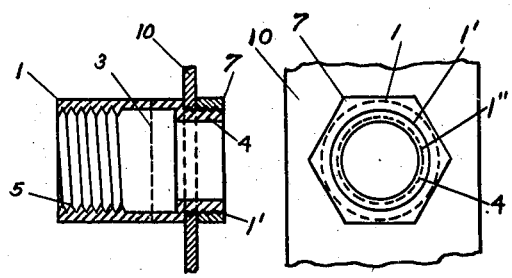
Figure 6 shows in section on the line 6—6 of Figure 7, an alternate form of coupling in which the cutter is arranged on the inside of a sleeve instead of on the outside of a pin, as in Figure 3.
Figure 8 shows an inner end view of the sleeve 1 and locknut 7.

In the alternate form of my apparatus the sleeve 1 may be secured in the wall 10 of the box by threading as in Figure 6 or by a lock-nut 7 threaded onto the reduced end 4 of the sleeve 1 and abutting against the wall 10, or by other suitable means.

A part of the sleeve 1 is bored out at 5a to equal the outside diameter of the conduit 8 and the portion of the sleeve adjoining said bore is internally threaded, the outermost thread being squarely cut off on a radial line and hardened to form a cutter 5' adapted to cut a thread in the periphery of the conduit.

The threads may be of the sizes common in pipes of that diameter, and when of that size, the cutters will readily cut a new thread in the relatively soft conduits.

In applying the first form of my apparatus, the pin 9 will be held in position by the internal threads in the hub 1' while starting to cut the threads in the periphery of the conduit 8, and in the alternate form of my apparatus, the bore 5a co-acting with the end of the conduit 8, will hold the sleeve and conduit in line so as to secure the proper cutting action of the cutter 5' and but little force will be required to cut the threads.

If desired, an opening 5c may be formed in the sleeve 1 to permit the escape of the chips as the thread is being cut.

In the form illustrated in Figure 3, the bore extends all the way through the hub 1' and any chips formed by the action of the cutter may pass out of the open end of the bore.

One advantage of the alternate form of coupling shown is that the forming of the threads in the conduit as the coupling is put together, will cause them to fit very tightly with the threads in the sleeve 1 and prevent leakage. Likewise the form of the hub 1' and the tight fit of the pin 9 therein, will tend to prevent any leakage therein.

As various modifications may be made in the form, proportions and composition of my apparatus, I do not limit my claims to the precise forms shown in the drawings.

I claim:

1. A conduit coupling comprising a sleeve to receive one end of the conduit, a transverse boss or extension formed integral with the sleeve, an internally threaded bore extending longitudinally of the boss into one side of which the periphery of the conduit will project when in coupled position, an externally threaded pin threadable into the bore having thread-cutting means at the leading end thereof to contact the periphery of the conduit and cut segments of threads therein when the pin is screwed into place in the bore.

2. A conduit coupling comprising a sleeve to receive one end of the conduit, a transverse boss or extension formed integral with the sleeve, an internally threaded bore extending longitudinally of the boss into one side of which the periphery of the conduit will project when in coupled position, and a combined set-screw and tap threadable into the bore having thread-cutting means at the leading end thereof to contact the periphery of the conduit and cut segmental threads therein when the pin is screwed into place in the bore.

3. A thread cutter comprising an internally threaded bore with a cut-away portion on one side of the bore into which one side of a pipe to have external segmental threads cut on one side thereof can project, a correspondingly threaded set-screw fitting into said bore and carrying at its point a cutter adapted, as the screw is rotated, to cut segmental threads into the projecting side of the pipe, and means for holding such pipe in position to be partially threaded.

HARRY J. CRINER.